(12) United States Patent
Kachouh

(10) Patent No.: US 7,665,794 B2
(45) Date of Patent: Feb. 23, 2010

(54) DRIVE ARRANGEMENT FOR MOTORIZED ACTUATION OF A FUNCTIONAL ELEMENT IN A MOTOR VEHICLE

(75) Inventor: Checrallah Kachouh, Dortmund (DE)

(73) Assignee: Brose Schliesssysteme GmbH & Co. KG, Wuppertal (DE)

( * ) Notice: Subject to any disclaimer, the term of this patent is extended or adjusted under 35 U.S.C. 154(b) by 382 days.

(21) Appl. No.: 11/553,615

(22) Filed: Oct. 27, 2006

(65) Prior Publication Data

US 2007/0137331 A1 Jun. 21, 2007

(30) Foreign Application Priority Data

Oct. 27, 2005 (DE) .................. 20 2005 016 953 U

(51) Int. Cl.
*F16H 27/02* (2006.01)
*F16H 29/02* (2006.01)

(52) U.S. Cl. .................. 296/146.3; 296/146.8; 296/56; 49/340; 74/89.35; 74/424.81

(58) Field of Classification Search .............. 296/146.8, 296/146.4, 106, 56, 101.1; 74/89.35, 424.81; 49/339, 340, 324
See application file for complete search history.

(56) References Cited

U.S. PATENT DOCUMENTS

| 2,674,453 | A | 4/1954 | Hummert | |
|---|---|---|---|---|
| 5,341,598 | A | 8/1994 | Reddy | |
| 5,944,376 | A * | 8/1999 | Buchanan, Jr. | ............ 296/146.4 |
| 6,516,567 | B1 | 2/2003 | Stone et al. | |
| 6,875,006 | B2 * | 4/2005 | Fischbach | .................. 425/589 |
| 6,983,669 | B2 * | 1/2006 | Clint et al. | ................ 74/424.75 |
| 2005/0252324 | A1 * | 11/2005 | Kato et al. | ................. 74/89.44 |

FOREIGN PATENT DOCUMENTS

| DE | 4225845 C1 | 7/1993 |
|---|---|---|
| DE | 4314146 C2 | 11/1994 |
| DE | 69325371 T2 | 10/1999 |

* cited by examiner

*Primary Examiner*—Patricia L Engle
*Assistant Examiner*—Sunsurraye Westbook
(74) *Attorney, Agent, or Firm*—David S. Safran; Roberts Mlotkowski Safran & Cole, P.C.

(57) ABSTRACT

Drive arrangement for motorized actuation of a functional element in a motor vehicle, having at least one drive, the drive having a drive motor and a spindle-spindle nut gear connected downstream of the drive motor for producing linear drive movements, the spindle-spindle nut gear having a spindle with an outside thread and a spindle nut with an inside thread, the linear drive movements being a motion of the spindle nut parallel to a spindle axis. the spindle-spindle nut gear has at least one telescoping sleeve with an inside thread and an outside thread. The at least one telescoping sleeve, spindle and spindle nut are arranged in a telescoping manner being screwed into one another with each outside thread forming a thread pairing with an respective inside thread. An alternative spindle-spindle nut gear has the outside thread and form a ball groove thread pairing with a variable thread pitch.

17 Claims, 5 Drawing Sheets

Fg . 1

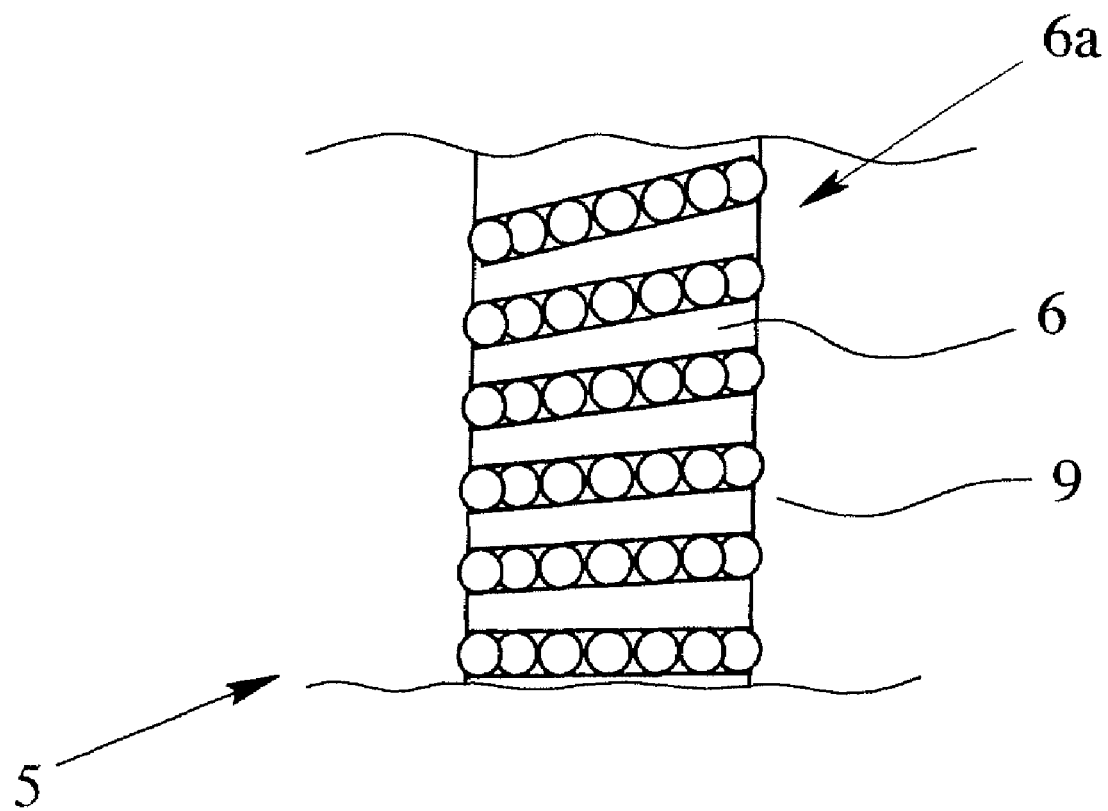
Fg 5

DRIVE ARRANGEMENT FOR MOTORIZED ACTUATION OF A FUNCTIONAL ELEMENT IN A MOTOR VEHICLE

BACKGROUND OF THE INVENTION

1. Field of the Invention

The invention relates to a drive arrangement for motorized actuation of a functional element in a motor vehicle with at least one drive, the drive having a drive motor and a spindle-spindle nut gear connected downstream of the drive motor for producing linear drive movements, the spindle-spindle nut gear having a spindle with an outside thread and a spindle nut with an inside thread, and the linear drive motion being moving the spindle nut parallel to the spindle axis.

2. Description of Related Art

Within the framework of enhancing the ease of operation in motor vehicles, drive arrangements of the type under consideration are becoming more and more important. The functional elements which can be moved by a motor here are, for example, hatches, especially rear hatches, rear covers, side doors or lifting roofs, vehicle seats or the like. In addition to high reliability and low costs, the compactness of such a drive arrangement plays an important part.

The known drive arrangement underlying the invention (U.S. Pat. No. 6,516,567) has a drive arrangement for motorized actuation of the rear hatch of a motor vehicle with two drives which act on the two side edges of the rear hatch by drive engineering. The drives each have a drive motor and a spindle-spindle nut gear connected downstream of the drive motor. The spindle-spindle nut gear, as is conventional, has a spindle with an outside thread which runs in the inside thread of a spindle nut. Driving the spindle allows the spindle-spindle nut gear to be moved between a retracted and an extended state. A linear drive motion, specifically motion of the spindle nut, parallel to the spindle axis, can thus be comparatively easily implemented.

The disadvantage in the known drive arrangement is that the spindle-spindle nut gear has a considerable length in the retracted state. This is due to the fact that the length of the spindle must correspond at least to the length of the desired feed path. This costs installation space in the interior of the vehicle which is fundamentally dimensioned to be tight. The large extension of the drive arrangement is also a problem in terms of aesthetics.

Furthermore, it must be considered that each rear hatch of a motor vehicle has a quite defined closing and opening characteristic. This means that the expenditure of force necessary to open or close the hatch changes when viewed over the entire closing and opening motion. For example, it can be that, to open the rear hatch of a motor vehicle, initially, an especially high force is necessary until gas pressure dampers which may be present support the opening motion. However, it can also be that these gas pressure dampers are not provided, so that the expenditure of force necessary for the opening motion is maximum when the hatch is almost completely opened. The design of the spindle-spindle nut gear, on the one hand, and the drive motor, on the other hand, therefore, constitutes a compromise in the known drive arrangement, in any case. This compromise leads to high costs since the drive motor is over-dimensioned for a considerable part of the positioning motion of the rear hatch.

SUMMARY OF THE INVENTION

A primary object of the invention is to embody and develop the known drive arrangement such that, with low construction effort, the required installation space is reduced and the design layout is optimized.

The aforementioned object is achieved in a drive arrangement of the initially mentioned type in which the spindle-spindle nut gear has at least one telescoping sleeve with an inside thread and an outside thread, the spindle being located inside the telescoping sleeve or telescoping sleeves and the spindle nut being entirely outside, the at least one telescoping sleeve and spindle being arranged in a telescoping manner with a capacity to be screwed into one another so that each outside thread forms a thread pairing with the inside thread which is adjacent at the time.

What is important is the consideration of applying the principle of a multistage telescoping jib to the spindle-spindle nut gear of the drive arrangement under consideration. In this connection, at least one telescoping sleeve is connected between the spindle and the spindle nut, by which sleeve the outside thread of the spindle can be lengthened to a certain extent. It could also be stated the other way around that the length of the inside thread of the spindle nut can be lengthened by the telescoping sleeve or the telescoping sleeves.

With the aforementioned integration of the telescoping sleeve or sleeves into the spindle-spindle nut gear, as a result, a reduction of the length of the spindle-spindle nut gear in the retracted state is ensured with the large feed path unchanged.

The outside thread of the spindle and the outside thread of the telescoping sleeve or the outside threads of the telescoping sleeves form a thread pairing with an assigned inside thread of the telescoping sleeve or sleeves or the spindle nut. In a preferred configuration, in the motorized positioning of the spindle, the individual thread pairings are traversed in a predetermined sequence in succession. "Traversal of a thread pairing" means here that one of the outside threads rotates relative to the inside thread assigned at the time, from which a drive motion results. A thread pairing, as such, in this sense, therefore, acts like a spindle-spindle nut gear in the conventional sense. Due to the telescopic structure, when one thread pairing is traversed, the following thread pairing and the components connected to it are pushed. Then, the following thread pairing is traversed, resulting in an additional drive motion.

In an especially preferred configuration, the different thread pairings have different friction values, the thread pairing to be initially traversed having a lower coefficient of friction than the thread pairing to be subsequently traversed. When the spindle is driven, the thread pairing with the lowest coefficient of friction is traversed first. In accordance with another preferred feature, after traversing a thread pairing, this thread pairing is blocked such that, then, the following thread pairing is blocked.

The sequential traversal of thread pairings is used for optimum layout of the drive arrangement. Here, it is provided that the different thread pairings have different thread pitches so that, as a result, for sequential traversal of the thread pairings, different gear stages are implemented. The thread pitches of the thread pairings can be matched to the closing and opening characteristics of the functional element, especially the hatch of a motor vehicle, so that over-dimensioning of the drive motor can be largely avoided.

In a configuration that is made especially compact, the spindle, the drive motor, and an intermediate gear and a clutch which may be present, are arranged directly in succession viewed along the spindle axis. This arrangement fundamentally does increase the length of the drive. However, this can be accepted since a quite considerable reduction of the length of the drive is associated with the above described telescoping configuration. Altogether, a high degree of compactness is achieved with this arrangement.

According to another teaching which acquires independent importance, the aforementioned object is achieved in a drive arrangement of the initially mentioned type in which the outside thread of the spindle and the inside thread of the spindle nut form a ball groove thread pairing which has a variable thread pitch over its length.

What is important is the knowledge that a ball groove thread pairing is suited to implementing a thread pitch which changes over the length of the ball groove thread pairing. "Ball groove thread pairing" means here a structure in the manner of a ball groove thread spindle in which between the two corresponding threads, here, there is a ball set between the outside thread of the spindle and the inside thread of the spindle nut. The advantage is the fact that, with it, gear multiplication which changes continuously during movement of the functional element can be implemented. In this way, the layout of the drive arrangement can be further optimized.

The invention is explained in detail below with reference to the accompanying drawings.

BRIEF DESCRIPTION OF THE DRAWINGS

FIG. 5 is an entirely schematic representation of a thread pairing of a drive arrangement of the invention made as a ball groove thread pairing in accordance with another embodiment.

DETAILED DESCRIPTION OF THE INVENTION

Figure 1:
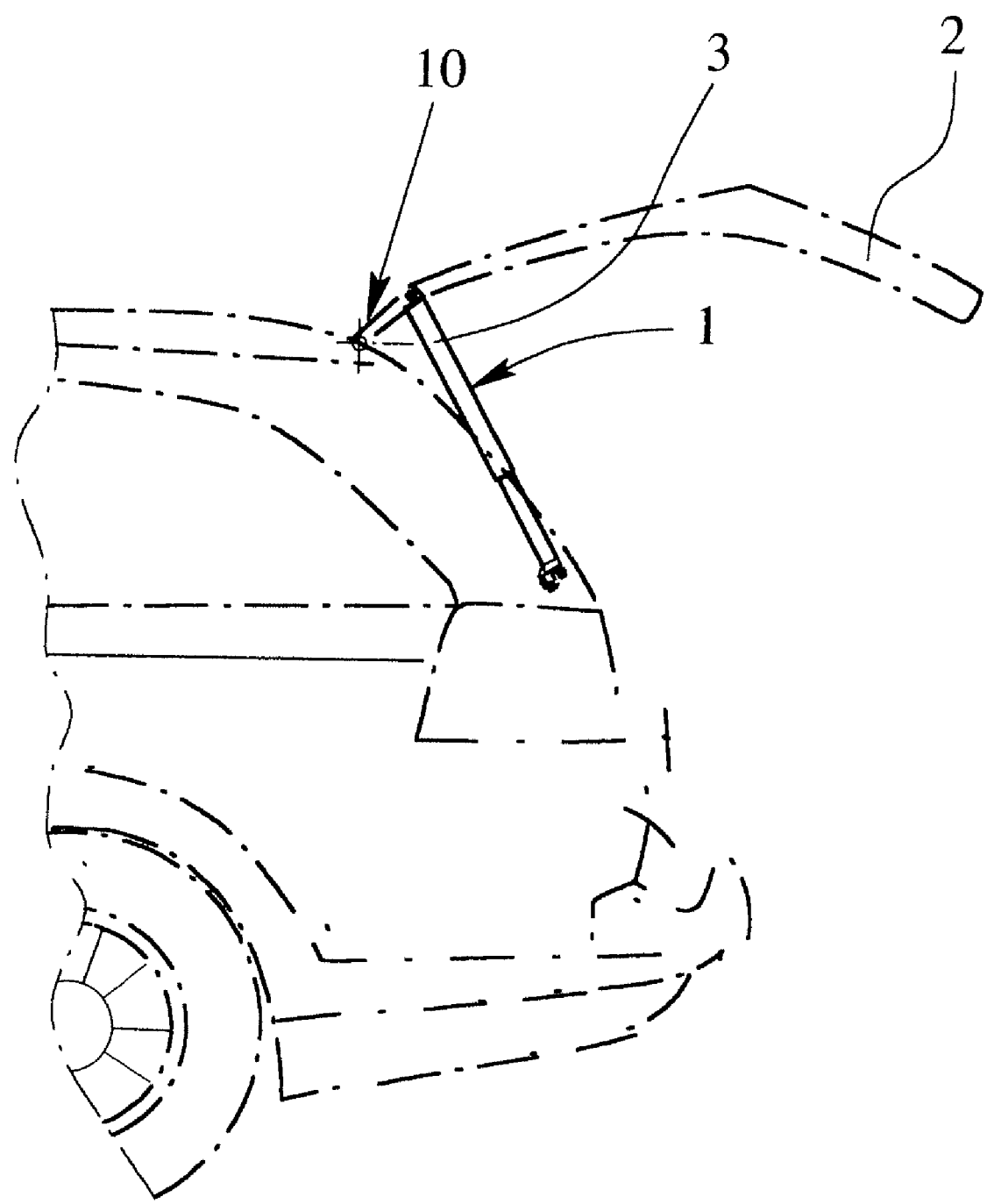
FIG. 1 is a side view of the rear part of a motor vehicle with a drive arrangement in accordance with the invention.
Figure 3:
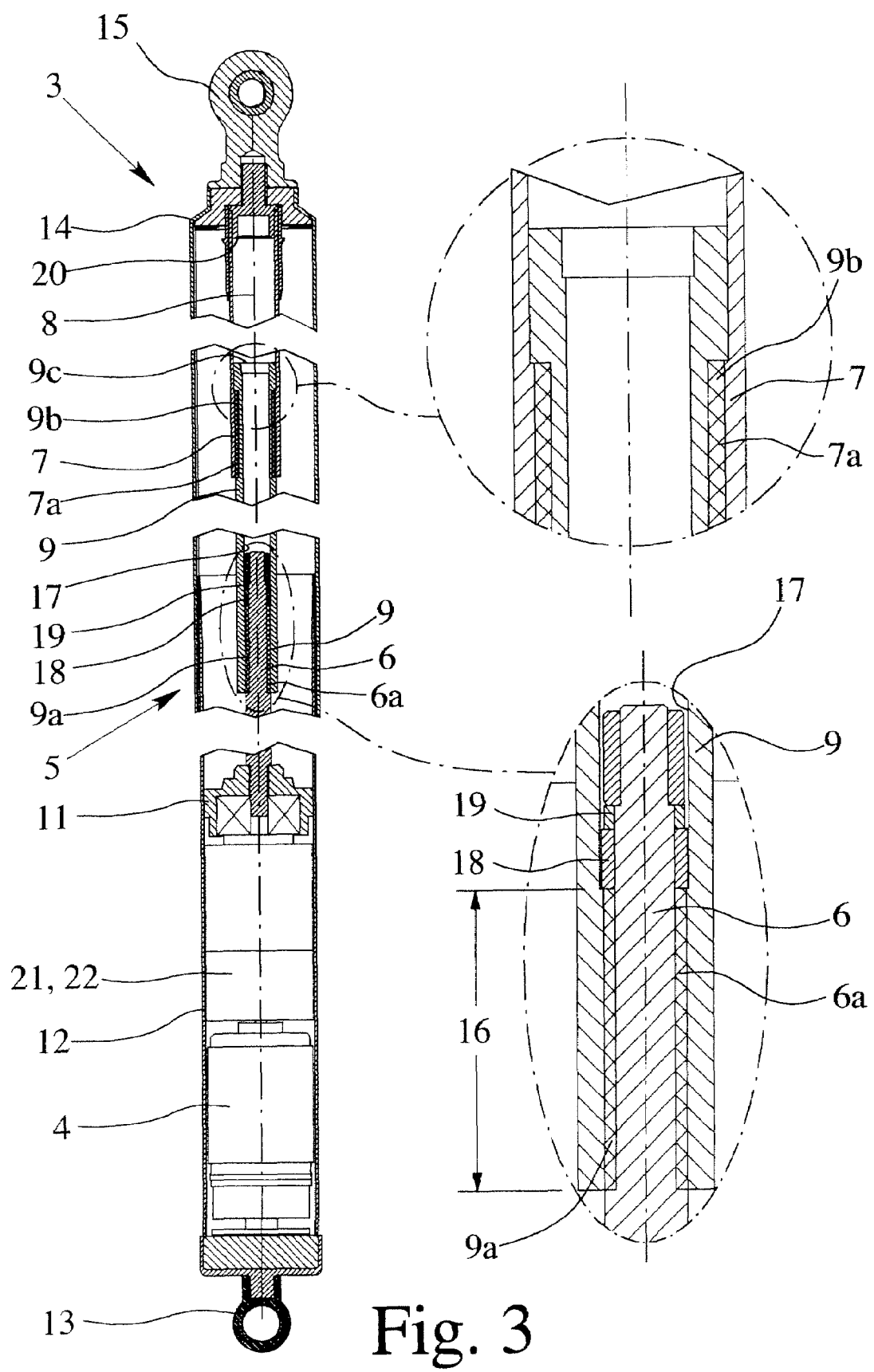
FIG. 3 shows the representation as shown in FIG. 2 with the spindle-spindle nut gear in the fully extended state, with details broken out and enlarged to the right.

The motor vehicle shown in FIG. 1 has a drive arrangement for motorized actuation of a functional element 2 in the form of a rear hatch with a drive 3. The drive 3 (shown in FIG. 3) is equipped with a drive motor 4 and a spindle-spindle nut gear 5 connected downstream of the drive motor 4 for producing linear drive movements. The spindle-spindle nut gear 5 has a spindle 6 with an outside thread 6a and a spindle nut 7 with an inside thread 7a (FIG. 3). The linear drive motion is provided by motion of the spindle nut 7 parallel to the spindle axis 8, as is fundamentally conventional in spindle-spindle nut gears.

Figure 2:
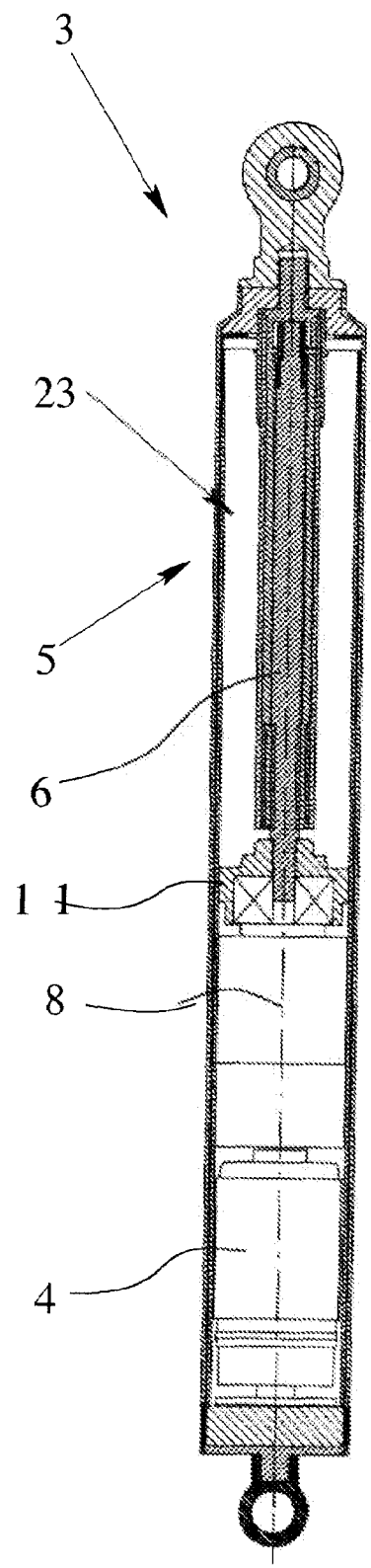
FIG. 2 is a sectional view of the drive of a drive arrangement of the invention when the spindle-spindle nut gear is in the retracted state.

The spindle-spindle nut gear 5, as compared to known spindle-spindle nut gears, is a modified arrangement in that there is at least one telescoping sleeve 9, here, with an inside thread 9a and an outside thread 9b, which is connected between the spindle 6 and the spindle nut 7. This is apparent when FIGS. 2 & 3 are viewed together. Here, it is such that the spindle 6 extends into the telescoping sleeve 9 and the spindle nut 7 is located entirely outside, in a telescoping manner with a capacity to be screwed into one another so that each outside thread 6a, 9b forms a thread pairing with the respective inside thread 9a, 7a. The indications "inside" and "outside" here relate to the direction which is radial with respect to the spindle axis 8. A "telescoping arrangement" means that the affected components 6, 7, 9 are arranged concentrically to the spindle axis 8 so that they can be internested in the manner of a multistage telescoping jib. "Threaded pair" means that the respective outside thread 6a, 9b is engaged by threads to the respective adjacent inside thread 9a, 7a. The manner of operation of this modified spindle-spindle nut gear 5 is explained in further detail below. The functional element 2 can fundamentally be any functional element in a motor vehicle. Examples have already been given above. Preferably, the functional element 2 is the hatch of a motor vehicle, the term "hatch" being understood comprehensively. This includes not only the rear hatch or the rear cover of a motor vehicle, but also the side door or the lifting roof of a motor vehicle.

In the preferred embodiment which is shown, the functional element 2 is the rear hatch 2 of a motor vehicle. The rear hatch 2 is coupled to the body of the motor vehicle to be able to pivot around a pivot axis 10, by which the hatch opening of the body can be opened and closed. The drive arrangement 1 here can have a single drive 3 which acts on the side edge of the rear hatch 2 by drive engineering. However, in an especially preferred embodiment, it is such that there are two drives 3 and that each the two drives 3 acts on a respective one of the two side edges of the rear hatch 2 by drive engineering. This is especially advantageous against the background of unwanted twisting of the rear hatch 2.

In the illustrated, preferred embodiment, the spindle 6 is pivotally mounted in a pillow block 11. The pillow block 11 is located in the spindle housing 12 on which the point of application of force 13 of the spindle-spindle nut gear 5 is located. The pillow block 11 in the installed state is rotationally fixed with respect to the spindle housing 12 and the first point of application of the force 13. The spindle 6 is coupled here to the drive motor 4 by drive engineering. However, basically, it can also be provided that the spindle nut 7 is coupled by drive engineering to the drive motor 4, the spindle 6 then being arranged rotationally fixed.

The spindle nut 7 is located in the spindle nut housing 14, the second point of application of force 15 of the spindle-spindle nut gear 5 being located on the spindle nut housing 14. The spindle nut housing 14 rotationally fixed with respect to the point of application of force 15 in the installed state. When drive movements are being produced by the drive motor 4, relative linear motion of the two points of application of force 13, 15 relative to one another takes place. The points of application of force 13, 15 in the installed state are fixed on the rear hatch 2, on the one hand, and on the body of the vehicle, on the other hand. FIGS. 2 & 3 show that the spindle nut housing 14 is arranged overlapping the spindle housing 12 so that the inside components are protected against fouling. In this connection, it is pointed out that the inside thread 7a of the spindle nut can also be made fundamentally as a component of the spindle nut housing 14.

In the illustrated preferred embodiment, there is a single telescoping sleeve 9, the outside thread 6a of the spindle 6 running in the inside thread 9a of the telescoping sleeve 9, and the outside thread 9b of the telescoping sleeve 9 running in the inside thread 7a of the spindle nut 7. In this way, the spindle-spindle nut gear 5 can be moved by rotating the spindle 6, fundamentally, from the retracted state shown in FIG. 2 into the extended state shown in FIG. 3. FIG. 3 shows that the telescoping sleeve 9, in the extended state of the spindle-spindle nut gear 5, to a certain extent, constitutes an extension of the outside thread 6a of the spindle 6. Conversely, it could also be said that the telescoping sleeve 9 constitutes an extension of the inside thread 7a of the spindle nut 7. This ensures that a considerable extension length can be implemented in spite of the short length of the spindle-spindle nut gear 5.

In another preferred configuration, it can also be provided that there are at least two telescoping sleeves which are able to be screwed into one another, the outside thread of the spindle running in the inside thread of the inner telescoping sleeve and the outside thread of the outer telescoping sleeve running in the inside thread of the spindle nut. With this, essentially any lengthening of the extension path is possible as long as the requirements for stability of the arrangement are ensured.

The arrangement is be made such that, in the motorized positioning of the spindle 6, the individual thread pairings are traversed in a predetermined sequence in succession. Here, it is preferably provided that, during traversal of a thread pairing, the other thread pairing or the other thread pairings are not traversed, and therefore, to a certain extent, constitute a rigid connection. In the illustrated preferred embodiment, when the spindle-spindle nut gear 5 is being moved from the retracted state into the extended state, the outside thread pairings are traversed after the inside thread pairings. In particular, it is such that proceeding from the retracted state shown in FIG. 2, first the outside thread 6a of the spindle 6 runs in the inside thread 9a of the telescoping sleeve 9 so that the telescoping sleeve 9 and thus the spindle nut 7 are moved relative to the spindle housing 12. After traversing this thread pairing, the outside thread 9b of the telescope sleeve 9 runs in the inside thread 7a of the spindle nut 7 so that the spindle nut 7 is moved relative to the telescoping sleeve 9 and thus also relative to the spindle housing 12. The transition from traversing the initially mentioned thread pairing to traversing the last named thread pairing is explained below.

In an especially preferred configuration, it is provided that the different thread pairings have different friction values, i.e., coefficients of friction, the thread pairing to be traversed initially preferably having a lower friction value than the thread pairing to be subsequently traversed. This means that proceeding from the retracted state of the spindle-spindle nut gear 5 shown in FIG. 2, first the outside thread 6a of the spindle 6 runs in the inside thread 9a of the telescoping sleeve 9, since the friction value between the spindle 6 and the telescoping sleeve 9 is less than the friction value between the telescoping sleeve 9 and the spindle nut 7. Of course, this can also be provided the other way around.

The different friction values of the different thread pairings can be implemented, for example, by different materials and/or coatings of the participating components, therefore, the spindle 6, the telescoping sleeve 9 or the telescoping sleeves and the spindle nut 7.

The transition of the traversal of one thread pairing to traversal of the following thread pairing now acquires special importance. In a preferred configuration, it is provided that, after traversing one thread pairing, the component 6, 9 which has the outside thread 6a, 9b of this thread pairing engages the component 9, 7 which has the inside thread 9a, 7a of this thread pairing by blocking, and that, in this way, the thread pairing to be subsequently traversed is traversed. In the illustrated embodiment, this can be implemented especially easily. Here, it is specifically such that the inside thread 9a of the telescoping sleeve 9 extends solely over a short lower area 16 of the telescoping sleeve and that the remaining inner part of the telescoping sleeve 9 is used as the running surface 17 for the bearing sleeve 18 located on the spindle 6. The bearing sleeve 18 in the direction of the spindle axis 8 adjoins a shoulder 19. The running surface 17 has a larger diameter than the inside diameter of the inside thread 9a of the telescoping sleeve 9.

If the spindle 6 is driven at this point, proceeding from the state shown in FIG. 2, based on the above described layout of the friction values of the thread pairings, first the outside thread 6a of the spindle 6 runs in the inside thread 9a of the telescoping sleeve 9 until the bearing bush 18 reaches the inside thread 9a of the telescoping sleeve 9. In this way, the spindle 6 engages the telescoping sleeve 9 by blocking so that as the spindle 6 continues to turn, the telescoping sleeve 9 is now turned at the same time. This ultimately leads to the outside thread 9b of the telescoping sleeve 9 running in the inside thread 7a of the spindle nut 7.

Proceeding from the extended state shown in FIG. 3, the spindle-spindle nut gear 5 can be transferred again into the retracted state by reversed driving of the spindle 6. Here, it is provided that the above described blocking between the spindle 6 and the telescoping sleeve 9 leads to a predefined jamming of these two components 6, 9 so that first the outside thread 9b of the telescoping sleeve 9 runs in the inside thread 7a of the spindle nut 7; this leads to the spindle-spindle nut gear 5 being pulled together first. As soon as the telescoping sleeve 9 with its front surface 9c reaches the stop 20 on the spindle nut housing 14, the telescoping sleeve 9 is blocked relative to the spindle nut 7. As the spindle 6 continues to turn, the above described jamming between the spindle 6 and the telescoping sleeve 9 is overcome, so that ultimately the outside thread 6a of the spindle 6 runs in the inside thread 9a of the telescoping sleeve 9 and the spindle-spindle nut gear 5 is transferred into the retracted state shown in FIG. 2.

The above described implementation of sequential traversal of the thread pairing constitutes a version which can be built especially easily. Other possible implementations are also conceivable here.

Figure 4:
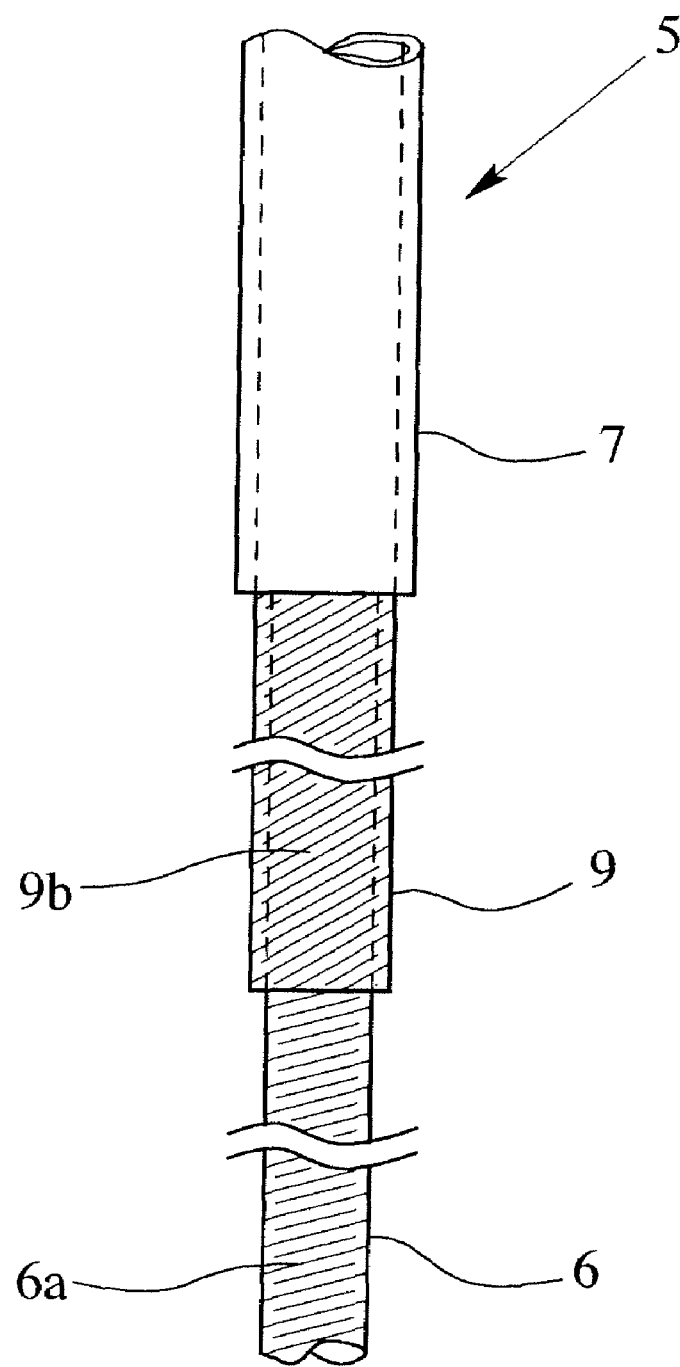
FIG. 4 is an entirely schematic representation of important components of a spindle-spindle nut gear of a drive arrangement in accordance with the invention according to another embodiment.

Additionally, the above described sequential traversal of the thread pairings can be used to provide the drive 3 of the drive arrangement 1 with different gear stages. For this purpose, it has been provided that different thread pairings have different thread pitches. This is shown schematically in FIG. 4. In the sequential traversal of the thread pairings, thus, different gear stages are implemented which are active or inactive depending on the thread pairing being currently traversed.

The above described implementation of different gear stages is especially advantageous in the configuration of the functional element 2 as the rear hatch 2 of the motor vehicle. In this connection, the thread pitches of the thread pairings are matched to the closing and opening characteristic of the rear hatch 2 so that, for a high force requirement, a gear stage with high multiplication and for a low force requirement a gear stage with low multiplication is active. The associated advantages were explained above.

According to one especially preferred configuration it is furthermore provided that the multiplication can be additionally changed within a thread pairing.

This can be implemented, for example, in that the thread pairing is made as a ball groove thread pairing which has a variable thread pitch over its length. This is shown schematically and only by way of an extract in FIG. 5. Here, the spindle 6 is made, for example, as a ball groove threaded spindle which interacts accordingly with the telescoping sleeve 9. The concept of "ball groove thread pairing" was explained in the Background part of this specification. Thus, within the thread pairing, a continuous change of the multiplication is possible during traversal of the thread pairing.

Finally, the structure of the drive 3 of the drive arrangement 1 which has proven to be especially compact should be pointed out. Here, it is provided that, between the spindle 6 and the drive motor 4, there are an intermediate gear 21 and a clutch 22. The spindle 6, the drive motor 4, and the intermediate gear 21 with the clutch 22 are located in direct secession viewed along the spindle axis 8. The sequence of this arrangement follows from FIGS. 2 & 3.

The spindle-spindle nut gear 5 is furthermore equipped with a spring arrangement 23 which creates a pre-tensioning between the spindle housing 12 and the spindle nut housing 14 in the direction of the extended state.

According to another teaching which acquires independent importance, a drive arrangement is proposed which, in turn, has a drive 3 with a drive motor 4 and downstream spindle-spindle nut gear 5. The spindle-spindle nut gear 5 here, differently from that described above, does not have a telescoping sleeve so that the outside thread 6a of the spindle 6 forms a thread pairing with the inside thread 7b of the spindle nut 7. Here, it is provided that this thread pairing is a ball groove thread pairing which has a changing thread pitch over its length. The operating principle is shown again by FIG. 5, if the reference number 9 there is replaced by reference number 7. The associated advantage of achieving continuously changing multiplication when the thread pairing is traversed was explained above in the description of the individual gear stages. Altogether, reference should be made to the aforementioned statements to the extent they do not relate to the specific configuration of the telescoping sleeve 9.

What is claimed is:

1. Drive arrangement for motorized actuation of a functional element in a motor vehicle, comprising:
    at least one drive, the drive having a drive motor and a spindle-spindle nut gear connected downstream of the drive motor for producing linear drive movements, the spindle-spindle nut gear having a spindle with an outside screw thread and a spindle nut with an inside screw thread, the linear drive movements being a motion of the spindle nut parallel to a spindle axis,
    wherein the spindle-spindle nut gear has at least one telescoping sleeve with an inside screw thread and an outside screw thread, the spindle being located extending inside the at least one telescoping sleeve and the spindle nut being located entirely outside the at least one telescoping sleeve,
    wherein the spindle, the at least one telescoping sleeve and spindle nut are arranged in a telescoping manner being screwed into one another with each outside thread forming a thread pairing with an respective inside thread;
    wherein the functional element is one of a rear hatch, a rear cover and a side door of a motor vehicle and wherein the functional element is coupled to the body of the motor vehicle to be pivotable around a pivot axis for opening and closing an opening of the body, and
    wherein the spindle-spindle nut gear has a single telescoping sleeve, wherein the outside screw thread of the spindle runs in the inside screw thread of the telescoping sleeve, and wherein the outside screw thread of the telescoping sleeve runs in the inside screw thread of the spindle nut.

2. Drive arrangement as claimed in claim 1, wherein the spindle is pivotally mounted in a pillow block, wherein the pillow block and the spindle nut, in an installed state, are arranged fixed against relative rotation therebetween.

3. Drive arrangement as claimed in claim 1, wherein the spindle-spindle nut gear has at least two telescoping sleeves which are telescopically arranged so as to be screwable one into the other, wherein the outside thread of the spindle runs in the inside thread of the inner telescoping sleeve and wherein the outside thread of the outer telescoping sleeve runs in the inside thread of the spindle nut.

4. Drive arrangement as claimed in claim 1, wherein the arrangement is such that motorized positioning of the spindle produces traversing of the individual thread pairings in a predetermined sequence in succession.

5. Drive arrangement as claimed in claim 4, wherein, when the spindle-spindle nut gear is moved from a retracted state into an extended state, the outside thread pairings are traversed after the inside thread pairings.

6. Drive arrangement as claimed in claim 4, wherein the different thread pairings have different friction values.

7. Drive arrangement as claimed in claim 6, wherein the thread pairing to be traversed first has a lower friction value than the thread pairing subsequently traversed.

8. Drive arrangement as claimed in claim 6, wherein the different friction values of the different thread pairings are produced by at least one of different materials and different coatings of at least one of the spindle, the telescoping sleeve, telescoping sleeves and spindle nut.

9. Drive arrangement as claimed in claim 4, wherein, after traversing a thread pairing, the component which has the outside thread of this thread pairing engages the component which has the inside thread of this thread pairing by blocking for enabling traversal of the next thread pairing.

10. Drive arrangement as claimed in claim 4, wherein the different thread pairings have different thread pitches so that for sequential traversal of the thread pairings different gear stages are implemented.

11. Drive arrangement as claimed in claim 10, wherein the thread pitches of the thread pairings are matched to the closing and opening characteristic of the functional element, so that a gear stage with a high multiplication is produced for a high force requirement and a gear stage with low multiplication is produced.

12. Drive arrangement as claimed in claim 1, wherein at least one thread pairing is a ball groove thread pairing and has a variable thread pitch over its length.

13. Drive arrangement as claimed in claim 1, wherein at least one of an intermediate gear and a clutch is provided between the spindle and the drive motor.

14. Drive arrangement as claimed in claim 1, wherein the spindle, the drive motor, and an intermediate gear with a clutch are located in direct secession viewed along the spindle axis.

15. Drive arrangement for motorized actuation of a functional element in a motor vehicle, comprising:
    at least one drive, the drive having a drive motor and a spindle-spindle nut gear connected downstream of the drive motor for producing linear drive movements, the spindle-spindle nut gear having a spindle with an outside thread and a spindle nut with an inside thread, the linear drive movements being a motion of the spindle nut parallel to a spindle axis,
    wherein the spindle-spindle nut gear has a spindle with an outside thread and a spindle nut with an inside thread, the linear drive movements being a motion of the spindle nut parallel to the spindle axis,
    wherein the outside thread of the spindle and the inside thread of the spindle nut form a ball groove thread pairing which has a variable thread pitch over its length; and
    wherein the functional element is one of a rear hatch, a rear cover and a side door of a motor vehicle and wherein the functional element is coupled to a body of the motor vehicle so as to be pivotable around a pivot axis for opening and closing an opening of the body.

16. Drive arrangement as claimed in claim 15, wherein the spindle is pivotally mounted in a pillow block, wherein the pillow block and the spindle nut, in an installed state, are arranged fixed against relative rotation therebetween.

17. Drive arrangement for motorized actuation of a functional element in a motor vehicle, comprising:
- at least one drive, the drive having a drive motor and a spindle-spindle nut gear connected downstream of the drive motor for producing linear drive movements, the spindle-spindle nut gear having a spindle with an outside thread and a spindle nut with an inside thread, the linear drive movements being a motion of the spindle nut parallel to a spindle axis,
- wherein the spindle-spindle nut gear has at least one telescoping sleeve with an inside thread and an outside thread, the spindle being located extending inside the at least one telescoping sleeve and the spindle nut being located entirely outside the at least one telescoping sleeve,
- wherein the spindle, the at least one telescoping sleeve and spindle nut are arranged in a telescoping manner being screwed into one another with each outside thread forming a thread pairing with an respective inside thread;
- wherein the functional element is one of a rear hatch, a rear cover and a side door of a motor vehicle and wherein the functional element is coupled to the body of the motot vehicle to be pivotable around a pivot axis for opening and closing an opening of the body, and
- wherein the spindle-spindle nut gear has at least two telescoping sleeves which are telescopically arranged so as to be screwable one into the other, wherein the outside thread of the spindle runs in the inside thread of the inner telescoping sleeve and wherein the outside thread of the outer telescoping sleeve runs in the inside thread of the spindle nut.

* * * * *